Nov. 1, 1932.    N. MONTELLANO    1,885,854
APPARATUS FOR KILLING INSECTS
Filed Feb. 26, 1930    2 Sheets-Sheet 1
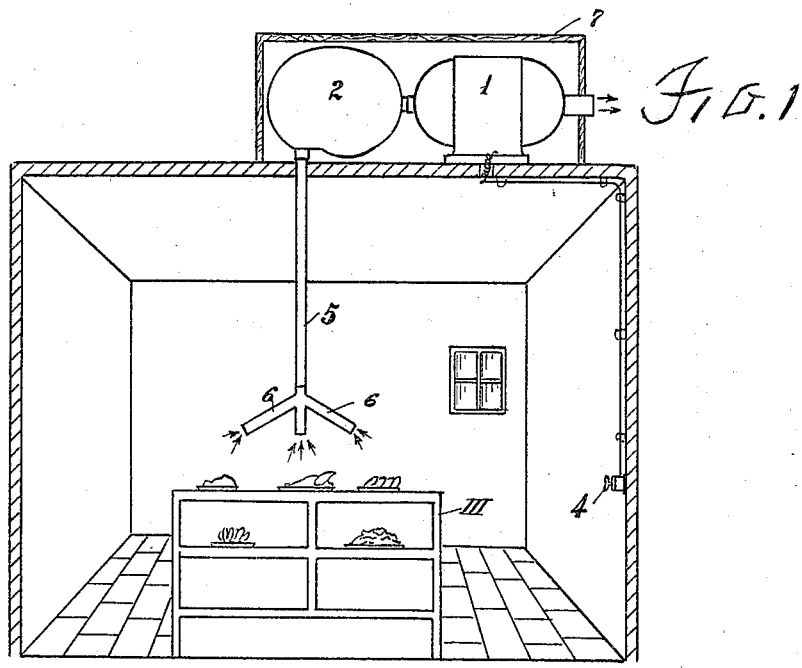
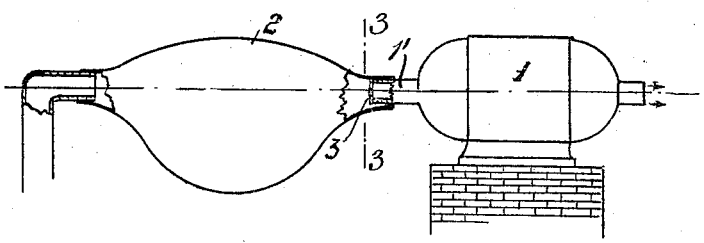
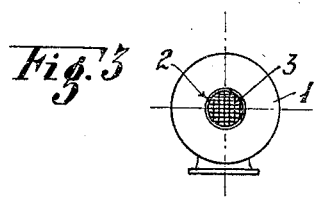
Inventor
Nestor Montellano
by
Att'ys

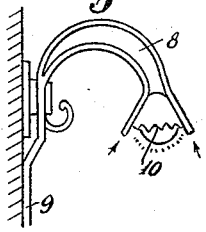
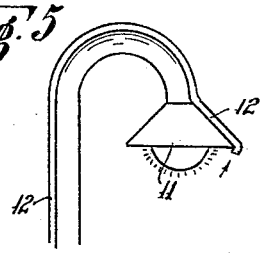
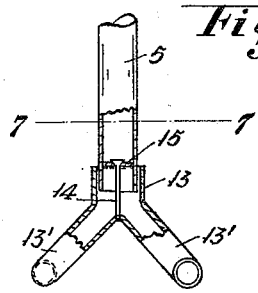
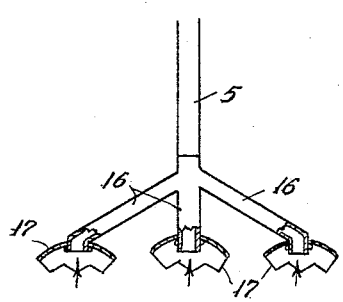
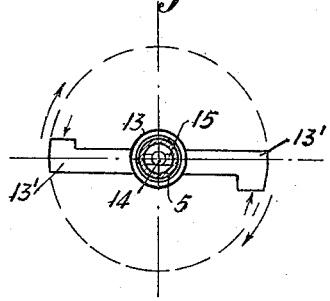

Patented Nov. 1, 1932

1,885,854

UNITED STATES PATENT OFFICE

NÉSTOR MONTELLANO, OF BUENOS AIRES, ARGENTINA

APPARATUS FOR KILLING INSECTS

Application filed February 26, 1930, Serial No. 431,539, and in Argentine Republic October 24, 1929.

This invention consists of an apparatus for killing insects its principal characteristic being that it catches those insects which are pernicious and dangerous to health by means of suction, acting either direct or in a spiral manner, to convey the insects to a receptacle where they remain entrapped and are destroyed.

This proceeding is based on the customs of insects, and of the different classes of insects which abound day and night.

For instance, during the day-time flies appear in the greatest number where there is most light, and when attracted by the presence of food, and in the late afternoon they are to be found on hanging objects, such as chandeliers, curtains, ceiling fans etc. with a view of remaining therefor the night.

The basic idea of catching or trapping insects by suction, the fundamental idea of this invention, has multiple forms of application: for instance for use in stables, meat stores, cooling chambers, sausage factories, tanners works, kitchens, etc. in which this system can be used with success.

At night time this system may be successfully used in malarial zones, or in parts of the country in which yellow fever in common, in which anopheles and other pests are to be found in the houses, in corners, in the cracks in the furniture, in the curtains, under tables, and spread all over the house, and which at nightfall fly to the best lighted spots, such as the drawing rooms, dining rooms, bed-rooms, etc. searching for victims to bite, and always approaching the lighting apparatus, where they would be caught and destroyed by my apparatus.

In public squares, gardens and places of amusement, enormous quantities of insects can be caught in the neighbourhood of the lamps, as well as in the houses, where branches of the apparatus could be applied to the lighting fixtures, so as to catch and destroy all insects approaching them.

The insect catching portion of the apparatus can be applied in multiple forms, from a simple conduit tube or end, to a suction head or head of decorative configuration associated with a lighting fixture or otherwise suspended in a place of use.

This manner of installation tends to benefit public sanitation, due to its prophylactic action, as it not only catches and destroys insects, but it also acts to purify the air in theaters, cinemas, churches and public meeting rooms, where the air is generally found to be laden with dust and other particles of matter and which is ordinarily inhaled in breathing.

With the foregoing and other equally important objects and advantages in view, the invention resides in the certain new and useful combinations, constructions and arrangements of parts as will be hereinafter more fully described, set forth in the appended claims, and illustrated in the accompanying drawings in which:

Figure 1 is a side elevation of a practical installation of the apparatus in a room, Figure 2 is a fragmentary side elevation, partly in section, of substantially the same apparatus, Figure 3 is a vertical section taken on the line 3—3 of Figure 2, Figure 4 is a side elevation of a side wall lighting fixture, showing the suction conduit or tube leading to the fixture exteriorly of the wall of the room, with two terminal branches thereof operatively associated with the fixture, Figure 5 is a view similar to that of Figure 4, but showing the suction conduit or tube installed alongside of the current supply conduit or cable leading to the fixture, the suction conduit or tube having a single terminal operatively associated with the fixtures, Figure 6 is a fragmentary side elevation, partly in section, of a suspended portion of a suction conduit or tube having a revolvable head made up of two angular branches, Figure 7 is a horizontal section taken on on the line 7—7 of Figure 6, and Figure 8 is a view similar to that of Figure 7 but showing the suction conduit or tube provided with a plurality of angularly arranged terminal branches, each having a stationary suction head of decorative hooded form.

Referring to the drawings, wherein like characters of reference designate corresponding parts in the several views thereof, and more particularly to Figures 1 to 3 inclusive, the embodiment of the invention, as shown therein by way of example only, is generally constituted in a suction device or motor 1, of conventional form, which is connected to a receptacle 2, such as a bag or the like, by means of a nipple or the like 1'. This receptacle 2 can be made in any desired shape other than as shown and not only be applied direct to the suction device 1 but be separated at a distance therefrom and connected to it by a length of conduit or tube (not shown).

At the entrance or nipple 1' of the suction device 1, a baffle of metallic cloth or the like 3 is tightly fixed in place over the orifice therein.

The suction device 1 is preferably operated by electricity and a control switch 4 is placed within convenient reach of an operator of the system.

Leading from the receptacle 2 is a suction conduit or tube 5, which can have its free end terminated at any illuminating fixture, as will be later explained, or, as shown in Figure 1, it is evident that the conduit or tube can be terminated in a number of branches 6, which may be suspended above a counter or other article of furniture on which diverse comestibles are exposed and which attract flies.

The suction device 1 and the receptacle 2, as shown in Figure 1, if placed on the roof of a building, will preferably be enclosed by a housing 7; however, the same may be installed in any other suitable place, indoors or out, or in cellars, underground, etc.

The lighting fixture 8 (Figure 4) shows a suction conduit or tube 9, which leads from a point of connection with the receptacle 2, having its extremity formed to provide branches terminating at the sides of a reflector or shade 10 of the fixture 8. This class of installation is to be employed on a lighting fixture to be mounted on the side walls of a room or the like, with the conduit or tube 9 extending from the fixture exteriorly of the supporting wall.

As shown in Figure 5, the light fixture 11 has a suction conduit or tube 12, leading to the same from the suction apparatus, alongside of the current supply conduit or cable thereof, and terminating at the edge of the reflector or shade of the fixture. This is in contra-distinction to the suction conduit or tube 9 leading to the fixture 8, as in Figure 4, on the outer side of the wall of the room.

In Figures 6 and 7, the suction conduit or tube 5 from the insect trapping and dust collecting receptacle 2, terminates at its free suspended end in a revolvable head 13 which has two branches 13' diametrically placed to cause rotary movement of the head when the suction device 1 is in operation. The head 13 is mounted for revolving movement on a vertical pin or shaft 14 depending from a cross bar 15 fixedly positioned within the end of the conduit or tube 5.

Finally, and as shown in Figure 8, the suction conduit or tube 5 may terminate in a multi-branched suction head, wherein the three branches 16 depicted have common connection to the free end of the conduit or tube 5 and have their free ends each provided with an inverted dished member or head 17. By having the heads 17 of a decorative configuration, i. e. flower shaper, for instance, of the shape of a tulip or the like, the suction head, in its entirety, will have the artistic appearance of a three light chandelier, such as will permit of its installation in dining or other rooms of a house.

In operation, the suction device 1 will be started up by closing the circuit control switch 4, when a current of air will be drawn inwardly of the suction heads or conduits, into and through the receptacle 2 and for subsequent discharge from the outlet side of the suction device, as is indicated by the arrows in Figure 1.

As will be well understood, the intake of air at the free end of the suction conduit or at a suction head will create a suction which will be effective in drawing flies and other insects inwardly of the latter from whence they will be conveyed to the receptacle 2, where they will be trapped until death ensues, the baffle 3, between the receptacle 2 and the suction device 1 acting to prevent the flies and insects from being passed from the receptacle into and outwardly of the suction device. The action of the system, as thus described, is the same for all of the several forms of suction conduits and heads herein mentioned as will be obvious.

Without further description, it is thought that the features and advantages of the invention will be readily apparent to those skilled in the art, and it will of course be understood that changes in form, proportion and minor details of construction may be resorted to, without departing from the spirit of the invention or its scope as claimed.

I claim:

1. In an apparatus of the class described, a suction device having an air inlet and an air outlet, a collector receptacle connected to the air inlet side of said suction device, a baffle disposed in the said connection, a suction conduit leading from said receptacle and a revolvable suction head at the free end of said suction conduit.

2. In an apparatus of the class described, a suction device having an air inlet and an air outlet, a collector receptacle connected to the air inlet side of said suction device, a suction conduit leading from said receptacle, and a revolvable suction head at the free end of said suction conduit, said head having a pair of oppositely directed tubes, the ends of the tubes being turned in opposite directions whereby a movement of the air will cause the head to revolve.

NÉSTOR MONTELLANO.